2,897,048

URANIUM RECOVERY PROCESS

John W. Stevenson, Webster Groves, Mo., and Robert G. Werkema, Granite City, Ill., assignors to the United States of America as represented by the United States Atomic Energy Commission No Drawing. Application May 2, 1956
Serial No. 582,304

6 Claims. (Cl. 23—14.5)

This invention deals with the recovery of uranium from magnesium fluoride slag obtained as a by-product in the production of uranium metal by the "bomb reduction process."

In the bomb reduction process uranium tetrafluoride is reduced with magnesium metal in an autoclave or "bomb." The bomb, in order that attack of its walls during reaction is reduced and also contamination of the uranium, is lined with a refractory material. Crushed and ground magnesium fluoride slag formed in the bomb process proved suitable for this purpose and economical. The excess slag not recycled for lining and to some degree also the "recycled slag" contain small quantities of uranium metal due to incomplete agglomeration; this uranium content fluctuates between about 2 and 7% and averages about 5%. It is desirable to recover this uranium from the slag and thereby to reduce its content at least to 0.05% prior to discarding it. The slags usually contain, in addition to magnesium fluoride and uranium, excess magnesium metal and compounds, e.g., oxides, of uranium and magnesium.

The uranium has been recovered from bomb slags by leaching with mineral acid, and good results have been obtained thereby. However, the acid leaching process proved disadvantageous in several respects. Filtration of the leach solution from the leach residue was rather slow, and a large filtration capacity was consequently necessary. Hydrofluoric acid was formed during the reaction which created quite a corrosion problem. Furthermore, part of the slag was dissolved by the acid which eventually resulted in a fluoride-contaminated uranium. The uranium compound, to be suitable for treatment in the refinery, should contain not more than one part of fluoride per 1000 parts of uranium.

It is an object of this invention to provide a process of recovering uranium from magnesium fluoride slag whereby these drawbacks are overcome.

It is thus an object of this invention to provide a process of recovering uranium from magnesium fluoride slag for which a comparatively small filtration capacity is needed.

It is another object of this invention to provide a process of recovering uranium from magnesium fluoride slag whereby the uranium content of said slag is reduced to an amount negligible from the economical point of view.

It is a further object of this invention to provide a process of recovering uranium from magnesium fluoride slag in which no free hydrofluoric acid is formed and thus no corrosion problem exists.

It is finally also an object of this invention to provide a process of recovering uranium from magnesium fluoride slag by which a very pure uranium product, especially in regard to fluoride content, is obtained so that it is suitable for direct treatment in the uranium refinery.

These objects are accomplished by finely grinding the slag, roasting the slag in air, leaching the roasted slag with an aqueous solution containing sodium bicarbonate whereby the uranium is dissolved, separating a product liquor containing the uranium from a residue, and adding alkali metal hydroxide to the product liquor whereby uranium is precipitated as diuranate.

Disintegration of the magnesium fluoride slag can be carried out by any method known to those skilled in the art, for instance in a ball mill. Wet-grinding is preferred to a dry-grinding procedure. It has been found that the particle size of the slag has a great effect on the degree of leaching obtained. The slag should be ground to a fineness that at least 70%, but preferably about 95%, pass through a 325-mesh screen and 100% of the slag through a 200-mesh screen. This amounts to an average particle size of less than 44 microns. Particle sizes considerably smaller than this do not give as satisfactory results as those specified.

After disintegration the slag is classified to remove coarse particles that mostly consist of uranium and/or magnesium metal which are not easily disintegrated; this coarse fraction is advantageously recycled to the ball mill or other grinding device.

It is necessary to convert the slightly soluble metallic uranium to the better-soluble oxide by roasting; the oxide predominantly obtained thereby is $U_3O_8$. Roasting can be carried out in any device, for instance in a rotary furnace which preferably has been preheated to about 370° C. Roasting between 350 and 525° C., but preferably between 400 and 500° C., was used; the very best results were obtained at temperatures between 425 and 485° C. An atmosphere of air was maintained during the roasting step, and this was preferably accomplished by introducing a stream of air during the operation and at the same time moving or stirring the slag, at least from time to time, in order always to expose new surfaces and thereby to accelerate and improve roasting. Roasting for about three hours at the temperatures specified above was found optimal, a longer roasting period converting the uranium to a compound less reactive than $U_3O_8$ whereby the leaching efficiency is impaired.

It was found that the addition of small quantities, for instance of about 1%, of sodium carbonate or sodium bicarbonate to the slag before roasting improved the roasting and thus the leaching efficiency. Also cooling of the roasted slag in a carbon dioxide atmosphere instead of air was found to have a beneficial effect.

The roasted slag is then ready for the leaching step. Uranium extraction with the leach solution was found to be better at lower pH values, preferably at pH values below 9.5. For this reason the addition of dilute sulfuric acid for neutralization of the roasted slag to a pH value of about 7 proved advantageous.

A mixture of sodium bicarbonate and sodium carbonate in aqueous solution yielded satisfactory leaching results. For instance, an aqueous solution containing 100 g. of sodium carbonate plus 10 g. of sodium bicarbonate per liter was found suitable; however, mixtures in any other proportion containing at least about 8% of bicarbonate were operative. The use of sodium bicarbonate alone, though, was found to give the best results; this probably is due to the better leaching efficiency obtained at lower pH values. While the concentration of sodium bicarbonate can vary widely, a solution about 0.7 M in $NaHCO_3$ was found optimal. The quantity of carbonate (bicarbonate alone or the carbonate-bicarbonate mixture) was advantageously adjusted so that an excess of about 25% was present over the stoichiometric quantity for the conversion of $U_3O_8$ to the carbonate complex $UO_2(CO_3)_3^{-4}$, the complex predominantly formed; minor quantities of $UO_2(CO_3)_2^{-2}$ are also obtained in this reaction. This, in the case of using sodium bicarbonate, amounted to about 1.88 lbs. of sodium bicarbonate per 1 lb. of uranium or about 1 to 3 lbs. of slag per 1 gallon of leach solution.

While the process is satisfactorily operative when a leach solution as described above is used, a further considerable improvement was accomplished by adding an oxidizing agent to the leach solution. Various types of oxidizing agents are suitable, but best results were obtained with calcium hypochlorite, $Ca(OCl)_2$, potassium permanganate and hydrogen peroxide. Hydrogen peroxide was preferably added in installments, for instance, the addition of 10 ml. of a 30% solution per each liter of leach solution every ½ hour during leaching was found to yield good results. The effect of an oxidizing agent on the leaching step is obvious from Examples I, II, and III. All examples in this specification are given for illustrative purposes only, and the data given therein are not to limit the scope of the invention.

EXAMPLE I

Two parallel runs were made to determine the rate of uranium dissolution from magnesium fluoride slag in carbonate and in carbonate-peroxide solutions, respectively. The first run was made using a leach solution containing 100 g. of $Na_2CO_3$ and 10 g. of $NaHCO_3$ per liter heated to 70° C. The solids content of the slurry was 100 g. of slag per liter of leach solution. Samples of slurry were obtained from time to time and filtered as rapidly as possible on a Büchner filter. Seventy-five-gram portions of the "Büchner cake" each were washed with a solution containing 20 g. of $Na_2CO_3$ per liter.

The second run was similar to the first run with the exception that 10 ml. of a 30% hydrogen peroxide solution was added every 30 minutes to each liter of leach solution. The analytical data obtained from these runs are shown in Table 1.

Table 1

| Time of sampling, minutes | Washed cake U analyses, percent (dry basis) | |
|---|---|---|
| | Carbonate leach | Carbonate-peroxide leach |
| 0 | 4.9 | 4.9 |
| 20 | 4.8 | 1.10 |
| 40 | 4.5 | 0.24 |
| 60 | 4.5 | 0.13 |
| 80 | 4.5 | 0.12 |
| 100 | 4.4 | 0.16 |
| 120 | 4.0 | 0.11 |
| 180 | 2.9 | 0.092 |
| 240 | 2.3 | 0.10 |

The table shows the improvement obtained by the use of hydrogen peroxide in the leach solution as the oxidizing agent. A single carbonate-peroxide leach produced a residue containing about 0.1% uranium in a leaching time of 2 hours. Extension of the leaching time to 4 hours did not result in additional extraction. While leaching with a carbonate solution extracted 53% of the uranium present, the carbonate-peroxide leach solution extracted about 97% of the uranium.

EXAMPLE II

Two parallel runs were made to study the effectiveness of potassium permanganate. The same slag as that used for Example I was treated in this instance.

The leaching treatment consisted of three 3-hour contacts of the slag, each time with fresh leach solution. The leaching temperatures were maintained at 70 to 80° C. Samples of leached cake were washed prior to analysis as described in Example I. The results of the two runs are compiled in Table 2.

Table 2

| Oxidizing agent | Washed cake U analyses, percent (dry basis) | | |
|---|---|---|---|
| | 1st leach | 2nd leach | 3rd leach |
| None | 4.10 | 2.20 | 0.50 |
| 10 g. $KMnO_4$/l | 0.30 | 0.22 | 0.14 |

EXAMPLE III

A series of runs on carbonate-bicarbonate leaches were made in which calcium hypochlorite was used as the oxidizing agent in varying concentrations. For run No. 1 the leach solution contained 40 g./l. of sodium bicarbonate and 60 g./l. of sodium carbonate, while for the other 4 runs the leach solutions contained 5% each of sodium carbonate and sodium bicarbonate. The leach temperature was between 80 and 90° C. The conditions and leach results of 4 stages are compiled in Table 3.

Table 3

| Run | g. $Ca(OCl)_2$ per 100 g. of slag | Percent uranium in leach cake | | | |
|---|---|---|---|---|---|
| | | First leach (1 hr.) | Second leach (2 hrs.) | Third leach (3 hrs.) | Fourth leach (3 hrs.) |
| 1 | 0 | ------ | ------ | 63.5 | ------ |
| 2 | 1 | 0.49 | 0.10 | 0.03 | 0.02 |
| 3 | 2 | 0.30 | 0.07 | 0.02 | 0.01 |
| 4 | 5 | 0.26 | 0.06 | 0.02 | 0.01 |
| 5 | 10 | 0.17 | 0.05 | 0.01 | 0.01 |

The above results indicate that a cake having less than the specified limit of 0.05% of uranium can be obtained by three carbonate leaches in the presence of from 1 to 10 g. of calcium hypochlorite per 100 g. of slag, and in 2 leaches with 10 g. of calcium hypochlorite. Higher quantities of hypochlorite increased the leaching efficiency to a negligible amount only.

EXAMPLE IV

Seven sets of leaching runs were made to study the effect of roasting and roasting temperature on the leaching efficiency. Roasting was carried out in air before each run. The leaches were made with a solution containing 100 g. of sodium carbonate and 10 g. of sodium bicarbonate per liter at 70 to 80° C. One liter of this leach solution was used for each 360 g. of slag, and five 3-hour leaches were used in each instance each stage being carried out with fresh leach solution. Two parallel runs were made in each set, one without hydrogen peroxide and the other one with hydrogen peroxide. The hydrogen peroxide was added in installments of 10 ml. per liter of slurry every 30 minutes. The results as well as the varied conditions are listed in Table 4.

Table 4

| Run No. | Uranium content of washed cakes, percent U (dry basis) | | |
|---|---|---|---|
| | Roasting temp., ° C. | Carbonate leach | Carbonate-$H_2O_2$ leach |
| 1 | (1) | 0.86 | 0.23 |
| 2 | 200 | 0.82 | 0.20 |
| 3 | 275 | 0.64 | 0.14 |
| 4 | 350 | 0.13 | 0.033 |
| 5 | 425 | 0.08 | 0.030 |
| 6 | 500 | 0.14 | 0.031 |
| 7 | 650 | 0.30 | 0.14 |

[1] No roasting.

The above results prove that roasting at temperatures of at least 350° C. and also the presence of an oxidizing agent in the leach solution are necessary to deplete the slag to a uranium content of below 0.05%.

EXAMPLE V

Two sets A and B of parallel experiments were carried out, each set consisting of 2 experiments using identical conditions except that in one experiment of each set dilute sulfuric acid was added to the slag before leaching until a pH of 7 was obtained. In one of the sets (both experiments) potassium permanganate was used as the oxidizing agent, while in the other one hydrogen peroxide was the oxidizing agent. The slag contained 4.5% of uranium, 0.20% of magnesium and 5.5% of MgO; 100 g. of the slag each were treated with one liter of the leach solution, and each leach was carried out for 3 hours at 70 to 80° C. The results are compiled in Table 5; the uranium contents are expressed on a dry basis.

*Table 5*

| Leach conditions | Insoluble uranium in leached slag, percent | | |
|---|---|---|---|
| | 1st leach | 2d leach | 3d leach |
| A. 100 g./l. Na$_2$CO$_3$, 10 g./l. NaHCO$_3$, 10 ml. 30% H$_2$O$_2$/l/30': | | | |
| Without neutralization | 0.085 | 0.068 | 0.058 |
| With neutralization | 0.033 | 0.015 | 0.010 |
| B. 100 g./l. Na$_2$CO$_3$, 10 g./l, NaHCO$_3$, 10 g./l. KMnO$_4$: | | | |
| Without neutralization | 0.17 | 0.11 | 0.06 |
| With neutralization | 0.031 | 0.017 | 0.010 |

The above results show that the pH value affects the leaching, neutralization of the slag prior to leaching improving the leaching efficiency greatly.

If potassium permanganate is used as the oxidizing agent a quantity of at least 0.22 lb. per 1 lb. of uranium, but preferably a 50% excess, should be used. This corresponds to a minimum quantity of 2 g. KMnO$_4$ per liter of solution; the preferred concentration of the permanganate ranges between 0.05 M and 0.2 M.

In the case of potassium permanganate as the oxidizing agent it was also found that the leaching efficiency could still furthermore be improved by adding calcium nitrate to the leach solution. The calcium nitrate possibly has a catalytic effect. The improvement obtained with calcium nitrate is obvious from Example VI.

EXAMPLE VI

Experiments are reported in Table 6 in which between 0 and 0.2 N calcium nitrate respectively, was added to the solution. The leach conditions in these experiments were 5 hours with a solution containing 50 g./l. of each sodium carbonate and sodium bicarbonate; the slurry contained 50 g. of slag per one liter of leach solution. The slag used contained 8.5% of uranium.

*Table 6*

| Molarity of NO$_3^-$ from Ca(NO$_3$)$_2$ addition | Insoluble uranium in leached slag, percent (dry basis) |
|---|---|
| No addition | 0.22 |
| 0.025 | 0.12 |
| 0.05 | 0.082 |
| 0.10 | 0.069 |
| 0.20 | 0.053 |

It was found that the leaching efficiency could be still furthermore improved by presaturating the leach solution with magnesium fluoride; by this, leaching was accelerated and the number of leaching steps necessary was reduced. This presaturation was conveniently accomplished by digesting the leach solution with leached slag.

As is obvious from the examples given above, the use of elevated temperature is preferred for the leaching step. It was found that leaching should be carried out with a solution of at least 60° C., but preferably of 70 to 95° C.

While leaching at atmospheric pressure was found satisfactory, the use of superatmospheric pressure improved the results. In this case a carbon dioxide atmosphere and a leach solution containing sodium bicarbonate only and no sodium carbonate were found best. Higher leaching temperatures and lower pH values are obtained under these conditions. The use of an oxidizing agent proved unnecessary if pressure-leaching was employed; in fact the results obtained under these conditions were better when no oxidizing agent was present. Example VII confirms these facts.

EXAMPLE VII

A magnesium fluoride slag which had been leached once at atmospheric pressure and contained, on a dry basis, 0.058% uranium was used for pressure-leaching in an autoclave. Two hundred grams of this preleached slag were used per liter of leach solution. The leach temperature was 140° C., the pressure 150 p.s.i.g., and the leaching time was 2 hours. The results are compiled in Table 7.

*Table 7*

| Leach liquor composition | Oxidant | Insoluble uranium in leached slag, percent (dry basis) |
|---|---|---|
| 100 g./l. Na$_2$CO$_3$, 10 g./l. NaHCO$_3$ | H$_2$O$_2$ | 0.048 |
| 100 g./l. Na$_2$CO$_3$, 10 g./l. NaHCO$_3$ | None | 0.042 |
| 100 g./l. NaHCO$_3$ | None | 0.013 |

It is obvious that the use of sodium bicarbonate alone yields better results than the carbonate mixture when pressure-leaching is employed.

It is understood that a series of leaching steps brings about a more complete uranium extraction than just one step. Considering the economical angle, a countercurrent two-step operation was preferred for most purposes, and pressure was advantageously applied for the second leaching step. Carrying out the second leaching step at atmospheric pressure but extending it for a period of between 3 and 5 hours, preferably 5 hours, at 90 to 95° C. was also found satisfactory.

Some of the uranium-containing product liquor is advantageously recycled either to the leaching vessel or to the hydroclassifier for the purpose of enriching the leach solution in uranium and in the latter case also in order to dilute the classifier feed to operative solids levels. The product liquor preferably contains about 20 g. of uranium per liter before it is further processed for uranium recovery.

After completion of the leaching steps the solids are removed from the slurry by filtration whereby the "product liquor" and the "filter cake" are obtained. A temperature of about 80° C. was found best for the filtration. The filter cake is then advantageously washed with water to remove any soluble uranium adhering thereto.

In the following an example is given which represents a comparison of the acid leach process as used heretofore with the process of this invention.

EXAMPLE VIII

For both, the acid and the carbonate process, a two-stage leach was carried out using a magnesium fluoride slag that had been roasted for 2 hours at 450 to 500° C. and 91% of which had a particle size of −325 mesh. The uranium content of this slag was 1% and a quantity of 400 g. was used for each experiment. The data of these two parallel runs are compiled in Table 8.

Table 8

FIRST STAGE

|  | Acid leach | Carbonate leach |
|---|---|---|
| Leach solution | 1,006 ml. 2 N H₂SO₄ contg. 8 g. KClO₃. | 1,000 ml. H₂O contg. 100 g. Na₂CO₃, 10 g. NaHCO₃+ total of 80 ml. 30% H₂O₂ (10 ml. added every 15′). |
| Leachg. time and temp. | 2 hrs., 82–89° C | 2 hrs., 78–90° C. |
| Filtration index | 0.172 ml./cm.²/min | 0.655 ml./cm.²/min. |
| Volume of filtrate | 880 ml | 1,000 ml. |
| Weight of wet cake | 414.4 g | 564.9 g. |
| H₂O in wet cake | 12.3% | 26.9%. |
| Fluoride content of filtrate. | 2.9 g./l | 0.14 g./l. |
| U content of dried cake. | 0.058% | 0.15%. |

SECOND STAGE

|  | Acid leach | Carbonate leach |
|---|---|---|
| Dry filter cake used | 295 g | 352 g. |
| Leach solution | 746 ml. 2 N H₂SO₄ contg. 8 g. KClO₃. | 880 ml. H₂O contg. 88 g. Na₂CO₃+8.8 g. NaHCO₃ +total of 80 ml. H₂O₂ added as in 1st stage. |
| Leachg. time and temp. | 2 hrs., 83–94° C | 2 hrs., 75–89° C. |
| Filtration index | 0.137 ml./cm.²/min. | 0.456 ml./cm.²/min. |
| Volume of filtrate | 735 ml | 827 ml. |
| Weight of wet cake | 325 g | 580 g. |
| H₂O in wet cake | 11.9% | 36.7%. |
| Fluoride content of filtrate. | 3.5 g./l | 0.20 g./l. |
| U content of dried cake. | 0.013% | 0.058%. |

It will be obvious from the above parallel experiments that although the leaching efficiency is greater with sulfuric acid than with the carbonate solution (one acid step accomplished the same result as two carbonate steps), the filtration index is significantly higher and the fluoride content of the uranium-containing product liquor is lower in the carbonate process. The addition of further leaching stages or extension of the second leaching stage for a longer period of time brought about the same leaching efficiency in the carbonate process as are obtained by the sulfuric acid treatment. The lower fluoride content has the advantage of less corrosion when, in later processing, the product is acidified, and also that of a pure final product.

The uranium may be recovered from the product liquor by any method known to those skilled in the art. Contact of the uranium solution with anion exchange resins, for instance, proved very satisfactory. The anion exchange resin is preferably in the sulfate, chloride or bicarbonate form, and elution is best with sodium chloride or sodium nitrate solution, preferably of a concentration of about 4 M. For instance, a cycle comprising passing the carbonate product liquor over the anion exchange resin in its bicarbonate form, eluting with a 4 M sodium nitrate solution, regenerating the depleted resin with a 1 M solution of sodium bicarbonate proved most satisfactory. Since permanganate interferes with the adsorption of the uranium carbonate complex and the adsorption from hypochlorite-containing solutions is not too good, the use of hydrogen peroxide as the oxidizing agent is preferred in the case of the uranium recovery by anion exchange methods.

The method preferred by the inventors for the recovery of the uranium values from the carbonate product liquor, though, is precipitation as the diuranate by a caustic, e.g., by an alkali metal hydroxide. It was found advisable to filter the product liquor prior to the precipitation step in order to remove minute amounts of magnesium fluoride crystals which had leaked through the filter used for the separation of the product liquor from the slurry. By this filtration step the fluoride content of the diuranate precipitate was considerably reduced, and when the precipitate was dissolved in nitric acid, for instance, for further processing, corrosion problems due to free hydrofluoric acid were kept to a minimum.

Sodium hydroxide was preferred as the caustic and it was best added in the form of a concentrated aqueous solution, for instance of about 50%. The quantity had to be sufficient to neutralize all sodium bicarbonate to sodium carbonate and to precipitate all uranium. The precipitation starts just about at the bicarbonate-neutralization point. An excess of about 0.07 to 0.1 lb. of sodium hydroxide per gallon of product liquor over the stoichiometric amount was found necessary for complete uranium precipitation. A digestion for at least 15 minutes at a temperature between 60° and 95° C. prior to filtration of the precipitate was found to improve the uranium recovery and filterability. In the following Example IX some experiments are described showing uranium precipitation from product liquor.

EXAMPLE IX

A product liquor was used which contained 3.8 g. U/l. and 0.30 g. F/l. Four runs were made each with a 50% sodium hydroxide solution in an excessive quantity of 0.08 lb. NaOH/gal. of product liquor over the stoichiometric amount, but using different digestion times and temperatures. The conditions and results are compiled in Table 9.

Table 9

| Digestion time, min. | Digestion temperature, °/C. | Concentration of U in residual liquor, g./l. |
|---|---|---|
| 10 | 77–87 | 0.03 |
| 15 | 90–97 | 0.015 |
| 20 | 60–80 | 0.016 |
| 45 | 25 | 0.042 |

The above data show that digestion at room temperature (25° C.) does not yield too good results and that for optimal uranium recovery a digestion of at least 15 min. at a temperature between 60° and 95° C. should be allowed to take place.

The precipitates of the four runs were combined and analyzed. The uranium content was found to be 50% and the fluoride content 0.09%.

The supernatant or filtrate, as the case may be, from the uranium recovery step by precipitation as just described can be recycled for utilization of its carbonate values.

The precipitate can be dissolved in nitric or other acid as indicated above. This is preferably done after washing with water. The uranium can then be recovered from the acid solution by any method customary in the art.

The optimal process conditions then comprise (1) roasting at 325° to 525° C. for not more than 3 hours; (2) the use of an oxidizing agent-containing leach solution, preferably potassium permanganate to reduce the cost of the process (although hydrogen peroxide was found to be a more effective oxidizing agent) in a quantity of at least 0.22 g. KMnO₄/g. U; (3) leaching at pH values below 9.5 and at a temperature of at least 60° C., optionally under pressure and with sodium bicarbonate only; (4) neutralization of the roasted slag with sulfuric or other acid to a pH value of about 7 prior to leaching; and (5) filtration of the product liquor prior to uranium precipitation.

It will be understood that this invention is not to be limited to the details given herein and that it may be modified within the scope of the appended claims.

What is claimed is:

1. A process of recovering uranium values from magnesium fluoride slag obtained in the reduction of uranium tetrafluoride with magnesium, comprising grinding said slag to a particle size of about −325 mesh; roasting the slag in air at a temperature of between 350 and 525° C. for a maximum period of time of approximately three hours; cooling the roasted slag in an at mosphere of carbon dioxide; neutralizing the slag with dilute aqueous sulfuric acid to a pH value of below 9.5; leaching the neutralized slag with an aqueous solution containing at least 8 percent by weight of sodium bicarbonate and an oxidizing agent, the total quantity of carbonate in said solution being about 25 percent in excess of that stoichiometrically required to convert the uranium oxide to a carbonate complex; filtering an insoluble uranium-depleted residue from a uranium-containing supernatant; adding an aqueous solution of sodium hydroxide to said supernatant whereby the uranium values are precipitated, and separating the uranium-containing precipitate from the aqueous solution.

2. The process of claim 1 wherein about 1 percent of a carbonate selected from the group consisting of sodium carbonate and sodium bicarbonate is added to the ground slag prior to roasting and the roasting temperature is between 400 and 500° C.

3. The process of claim 1 wherein the roasting temperature is between 425 and 485° C.

4. The process of claim 1 wherein neutralization with sulfuric acid is carried out until a pH value of about 7 is obtained.

5. The process of claim 1 wherein the oxidizing agent is hydrogen peroxide and leaching is carried out at a temperature of between 60 and 95°C.

6. A process of recovering uranium values from magnesium fluoride slag obtained in the reduction of uranium tetrafluoride with magnesium, comprising grinding said slag to a particle size of about −325 mesh; roasting the slag in air at a temperature of between 425 and 485° C. for a maximum period of time of approximately three hours; cooling the roasted slag in an atmosphere of carbon dioxide; neutralizing the slag with dilute aqueous sulfuric acid to a pH value of about 7; leaching the neutralized slag with an aqueous solution at between 60 and 95° C. and under superatmospheric pressure, said solution consisting of an at least 8 percent solution of sodium bicarbonate, the quantity of said solution being such that about 25 percent bicarbonate in excess of that stoichiometrically required to convert the uranium oxide to a carbonate complex are added; and filtering an insoluble uranium-depleted residue from a uranium-containing supernatant.

References Cited in the file of this patent
UNITED STATES PATENTS 2,733,126  Spiegler _____ Jan. 31, 1956

OTHER REFERENCES

Bearse et al.: AEC Document BMI–JDS–130, June 30, 1948; pages 8, 15–17, 48, 65–66.

Richardson et al.: AEC Document BMI–JDS–195, June 30, 1948; pages 21–36.

Brown: AEC Document ACCO–36, Oct. 15, 1953; pages 7–10 and 29–30.